United States Patent
Papak et al.

(10) Patent No.: US 10,387,231 B2
(45) Date of Patent: Aug. 20, 2019

(54) DISTRIBUTED SYSTEM RESILIENCY ASSESSMENT USING FAULTS

(71) Applicant: Microsoft Technology Licensing, LLC, Redmond, WA (US)

(72) Inventors: Dinko Papak, Redmond, WA (US); LeninaDevi Thangavel, Redmond, WA (US); Richard Gregory Endean, Jr., Renton, WA (US); Dmitri A. Klementiev, Redmond, WA (US); Dhruv Gakkhar, Bellevue, WA (US); Varun Jain, Redmond, WA (US); Michail Zervos, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 289 days.

(21) Appl. No.: 15/273,531

(22) Filed: Sep. 22, 2016

(65) Prior Publication Data

US 2018/0060202 A1 Mar. 1, 2018

Related U.S. Application Data

(60) Provisional application No. 62/380,129, filed on Aug. 26, 2016.

(51) Int. Cl.
*G06F 11/26* (2006.01)
*G06F 11/07* (2006.01)
(Continued)

(52) U.S. Cl.
CPC ...... *G06F 11/0709* (2013.01); *G06F 11/2289* (2013.01); *G06F 11/263* (2013.01);
(Continued)

(58) Field of Classification Search
CPC ...... G06F 11/26; G06F 11/263; G06F 11/277; G06F 11/28; G06F 11/3409; G06F 11/3414; G06F 11/3433; H04L 43/50
See application file for complete search history.

(56) References Cited

U.S. PATENT DOCUMENTS

| | | | | |
|---|---|---|---|---|
| 6,421,350 B1 * | 7/2002 | Szurkowski | ......... | H04M 7/006 370/235 |
| 6,484,276 B1 * | 11/2002 | Singh | .................... | G06F 11/263 714/38.13 |

(Continued)

OTHER PUBLICATIONS

Pham, et al., "Failure Diagnosis for Distributed Systems using Targeted Fault Injection," In Proceedings of IEEE Transactions on Parallel and Distributed Systems, Issue 99, Jun. 2, 2016, pp. 1-14.

(Continued)

*Primary Examiner* — Joseph O Schell
(74) *Attorney, Agent, or Firm* — Mannava & Kang, P.C.

(57) ABSTRACT

A method and system for assessing resiliency of a system is provided. A fault injection system may, for each of a plurality of dimensions of a fault profile, access an indication of possible values for the dimension, which may be specified by a user. The fault injection system may, for each of a plurality of fault profiles, automatically create the fault profile by, for each of the plurality of dimensions, selecting by the computing system a possible value for that dimension. For at least some of the fault profiles, the fault injection system injects a fault based on the fault profile into the system and determines whether a failure was detected while the fault was injected.

17 Claims, 10 Drawing Sheets

(51) Int. Cl.
   *G06F 11/34* (2006.01)
   *G06F 11/22* (2006.01)
   *G06F 11/263* (2006.01)
   *G06F 11/277* (2006.01)
   *H04L 12/26* (2006.01)

(52) U.S. Cl.
   CPC ...... *G06F 11/3409* (2013.01); *G06F 11/3433* (2013.01); *G06F 11/26* (2013.01); *G06F 11/277* (2013.01); *G06F 11/3414* (2013.01); *H04L 43/50* (2013.01)

(56) References Cited

U.S. PATENT DOCUMENTS

| | | | | |
|---|---|---|---|---|
| 7,032,133 | B1* | 4/2006 | Lang | G06F 11/263 714/32 |
| 9,317,408 | B2 | 4/2016 | Szpak | |
| 9,727,432 | B1* | 8/2017 | Cutforth | G06F 11/3452 |
| 2002/0178416 | A1* | 11/2002 | Chen | G06F 11/27 714/733 |
| 2003/0236844 | A1* | 12/2003 | Kaler | G06F 11/36 709/206 |
| 2004/0168111 | A1* | 8/2004 | Arnold | G06F 11/3664 714/57 |
| 2005/0204028 | A1* | 9/2005 | Bahl | H04L 41/0873 709/223 |
| 2008/0215925 | A1* | 9/2008 | Degenaro | G06F 11/263 714/41 |
| 2008/0232760 | A1* | 9/2008 | Xia | H04B 10/0775 385/140 |
| 2008/0295081 | A1* | 11/2008 | Albot | G06F 11/3688 717/128 |
| 2008/0307258 | A1* | 12/2008 | Challenger | G06F 11/1438 714/20 |
| 2013/0275518 | A1* | 10/2013 | Tseitlin | G06F 11/36 709/206 |
| 2014/0280904 | A1* | 9/2014 | Bugenhagen | H04L 43/50 709/224 |
| 2015/0081243 | A1* | 3/2015 | Ganai | G06F 11/3688 702/123 |
| 2015/0161025 | A1 | 6/2015 | Baset et al. | |
| 2017/0024299 | A1* | 1/2017 | Deng | G06F 11/3414 |

OTHER PUBLICATIONS

Ju, et al., "On Fault Resilience of OpenStack," In Proceedings of the 4th annual Symposium on Cloud Computing, Oct. 1, 2013, 16 pages.

Joshi, et al., "Prefail: A Programmable Tool for Multiple-Failure Injection", In Proceedings of the ACM international conference on Object oriented programming systems languages and applications, Oct. 22, 2011, 17 pages.

Nita, et al., "FIM-SIM: Fault Injection Module for CloudSim Based on Statistical Distributions," In Journal of Telecommunications and Information Technology, Apr. 2014, pp. 14-23.

Hao, et al., "Distributed Systems verification using fault injection approach," In Master Thesis of Chalmers University of Technology, Retrieved on: Jul. 1, 2016, 51 pages.

Umadevi, et al., "A Review on Software Fault Injection Methods and Tools", In International Journal of Innovative Research in Computer and Communication Engineering, vol. 3, Issue 3, Mar. 2015, pp. 1582-1587.

Holler, et al., "QEMU-Based Fault Injection for a System-Level Analysis of Software Countermeasures Against Fault Attacks," In Proceedings of the Euromicro Conference on Digital System Design, Aug. 26, 2015, pp. 530-533.

Kari, et al., "TEDS: Testing Environment for distributed systems in cloud," In International Journal of Computer Science and Information Technology & Security, vol. 2, Issue 3, Jun. 2012, pp. 498-502.

Xiaoyong, et al., "Dependability Analysis on OpenStack IaaS Cloud: Bug Anaysis and Fault Injection," In Proceedings of IEEE 6th International Conference on Cloud Computing Technology and Science, Dec. 15, 2014, pp. 18-25.

Cavalli, et al., "A survey on formal active and passive testing with applications to the cloud," In Proceedings of Annals of Telecommunications, vol. 70, Issue 3, Apr. 2015, pp. 1-9.

Irrera, et al., "A Practical Approach for Generating Failure Data for Assessing and Comparing Failure Prediction Algorithms," In Proceedings of IEEE 20th Pacific Rim International Symposium on Dependable Computing, Nov. 18, 2014, pp. 86-95.

Alvaro, Peter Alexander, "Data-centric Programming for Distributed Systems," In Technical Report of UCB/EECS-2015-242 of University of California, Dec. 17, 2015, 163 pages.

* cited by examiner

DISTRIBUTED SYSTEM RESILIENCY ASSESSMENT USING FAULTS

CROSS-REFERENCE TO RELATED APPLICATION(S)

This application claims the benefit of U.S. Provisional Patent Application No. 62/380,129 filed Aug. 26, 2016, which is incorporated herein by reference in its entirety.

BACKGROUND

Distributed systems are becoming more complex in their components and the interactions between their components. For example, a distributed system that provides a web interface for its users may include a front-end system that receives requests and sends responses, a back-end system that handles the requests and generates the responses, and a database system that stores and retrieves the data of the user and data of the distributed system. Each of these systems may have many components. For example, a front-end system may include a load-balancing component, a Representational State Transfer ("RESTful") interface, a Simple Object Access Protocol interface, an Electronic Data Interchange Interface, performance monitors, security components, and so on.

In addition, the number of users of a distributed system can be very large—in some cases over one billion users. Because of the large number of users, such a distributed system may need to be deployed on thousands of computers located at data centers throughout the world. In addition to the systems and components described above, a distributed system may also include systems to automatically allocate additional computational resources as needed, deploy updates to the components, implement failover systems in case of failure, and so on.

The developers of these distributed systems go to great lengths to ensure that the distributed systems are resilient to failures. A failure of even a single component can cause a cascade of failures in other components of the distributed system. For example, a failure of a load balancer of a front-end system can cause all traffic to be routed through a small number of computers, which may cause the back-end system that handles the requests from those computers to become overloaded and fail, and so on. A distributed system is considered to be resilient to a failure when the distributed system can take steps to counteract the failure with little or no perceptible impact on system performance. For example, if the front-end system detected the failure of the load balancer and automatically routed network traffic through a backup load balancer, the distributed system would be considered resilient to the failure of the primary load balancer. Because of the complexities of these distributed systems, it is virtually impossible to ensure that they will be resilient to all types of possible failures.

To help ensure that a distributed system is resilient, various approaches to testing the resiliency have been used. These approaches generally test a distributed system while it is in production that is processing real data for users. In one approach, the provider of the distributed system manually generates failure scenarios in which the distributed system may fail. The provider then tests these failure scenarios to verify that the distributed system is resilient. A disadvantage of this approach is that it can be very time-consuming to generate the failure scenarios. As a result, the testing may be less than comprehensive. Furthermore, the failure scenarios may need to be modified whenever the configuration of the distributed system changes. In another approach, a provider may test a failure scenario (e.g., loss of power of a machine) on random percentages of machines to verify the distributed system is resilient. A disadvantage of this approach is that simply varying the percentage of machines may not be able to detect failures that depend, for example, on different intensities of the failure scenario on different machines.

SUMMARY

A method and system for assessing resiliency of a system is provided. A fault injection system may, for each of a plurality of dimensions of a fault profile, access an indication of possible values for the dimension, which may be specified by a user. The fault injection system may, for each of a plurality of fault profiles, automatically create the fault profile by, for each of the plurality of dimensions, selecting by the computing system a possible value for that dimension. For at least some of the fault profiles, the fault injection system injects a fault based on the fault profile into the system and determines whether a failure was detected while the fault was injected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION

FIG. 3 is a diagram that illustrates a user interface for generating a resiliency assessment plan in some embodiments.

DETAILED DESCRIPTION

Figure 1:
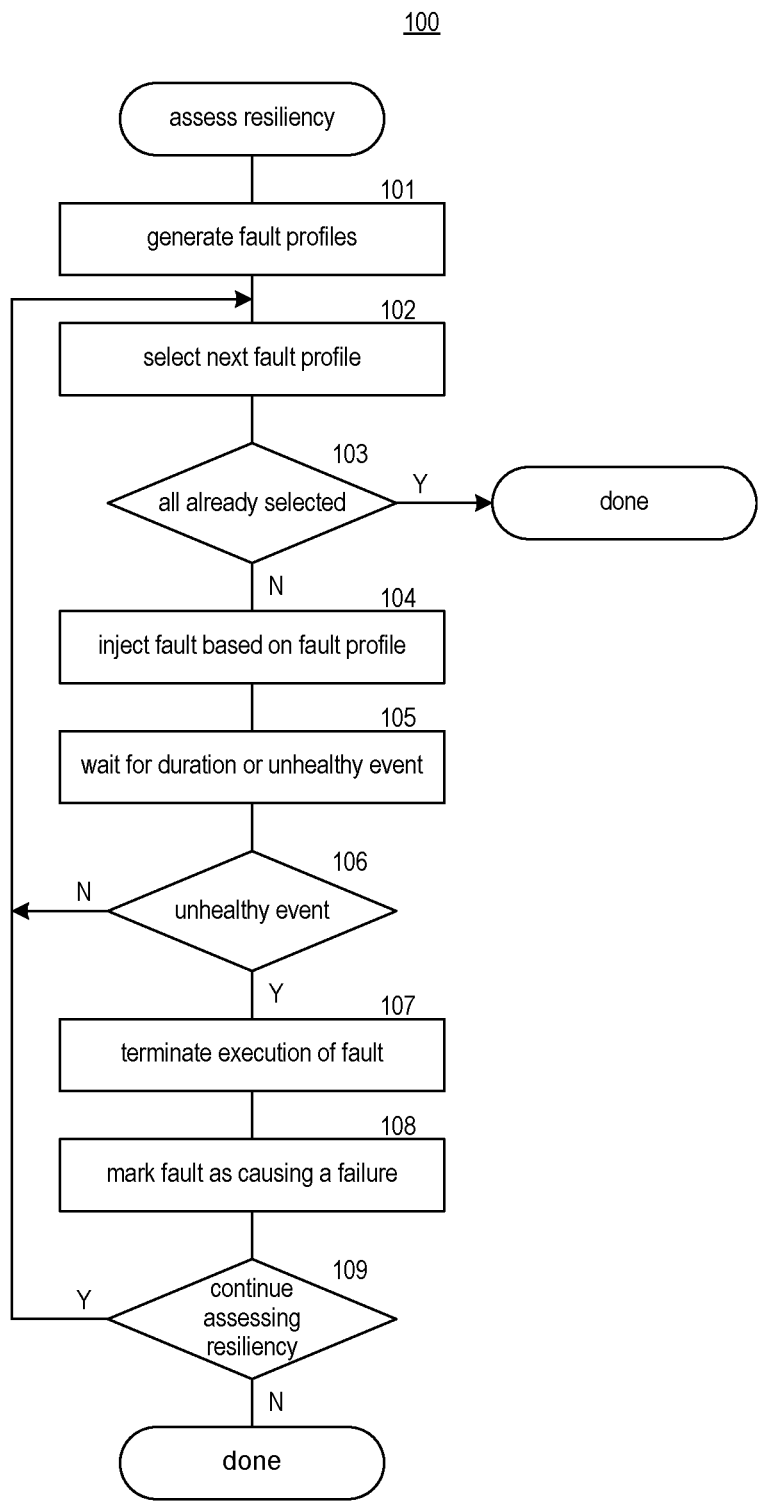
FIG. 1 is a flow diagram that illustrates the overall processing to assess the resiliency of a system in some embodiments.

A method and system for assessing the resiliency of a distributed system is provided. A fault injection system assesses the resiliency by generating fault profiles, injecting faults based on the fault profiles, and determining whether the fault caused a failure. A fault profile specifies a value for each dimension of a fault. The dimensions of a fault may include fault type, number of machines (e.g., virtual machines), duration of the fault, configuration based on fault type, and so on. The fault type indicates the condition that may result in a fault. For example, the conditions may include excessive memory usage, excessive non-memory storage usage, excessive CPU usage, loss of computer power, a network access problem, a security problem, a process kill, restart, or crash, a corrupt file system, and change in system date, and so on. The number of machines indicates the number of machines affected by the fault. For example, the number of machines may be a percentage of the number of machines of the distributed system. The duration of the fault indicates the length of time the fault is to be executed. For example, a duration may be 5 minutes or 2 hours. The configuration is a dimension that is specific for the fault type. For example, the configuration for an excessive CPU usage fault type may indicate the intensity of the usage as 80%, which means that the fault should consume 80% of the CPU cycles. As another example, the configuration for a network connection fault type may indicate the connection or port that has failed. A fault profile is thus a specification of a value for each dimension. A fault profile indicating a fault type of CPU, a number of machines as 50%, a duration of 5 minutes, and an intensity of 80% may be represented by the following tuple:

(CPU, 50%, 5 minutes, 80%).

A fault profile indicating a fault type of a malware infection, a number of machines as 20, a duration of 2 minutes, and a configuration of ransomware may be represented by the following tuple:

(Malware, 20, 2 minutes, ransomware).

In some embodiments, the fault injection system creates fault profiles of faults that are to be injected into a distributed system while it is in production. To generate a fault profile, the fault injection system accesses a resiliency assessment plan that specifies possible values of each dimension and possibly the number of fault profiles to be created. For example, the possible values for fault type may specify the fault type for the resiliency assessment plan such as only CPU usage, memory usage, or a malware fault. As another example, the possible values for number of machines may specify a range of 50-80% of the machines. A resiliency assessment plan may be represented as follows:

(CPU, 50-80%, 2-5 minutes, 75-100%).

The fault injection system creates fault profiles based on the resiliency assessment plan. For example, given the above resiliency assessment plan, the fault injection system may generate the following fault profiles:

(CPU, 55%, 3 minutes, 90%)
(CPU, 70%, 5 minutes, 85%)
(CPU, 60%, 2 minutes, 70%).

The fault injection system then injects faults corresponding to the fault profiles. The fault injection system may inject a fault by selecting the percentage of virtual machines as indicated by the fault profile and sending the fault to an agent of the fault injection system that executes on the physical machine or virtual machine that hosts the distributed system. The agent is responsible for executing the fault. Faults of different fault types are executed in different ways. The agent may consume the CPU cycles by actually executing instructions or by reducing the number of CPU cycles allocated to the virtual machine. After a fault is injected, the fault injection system monitors the distributed system to determine whether a failure was detected. When a failure is detected, the fault injection system may terminate execution of the fault to help limit the effect of the failure on the distributed system.

The fault injection system may inject faults corresponding to the fault profiles one at a time. A next fault is injected after the execution of the previously injected fault is terminated as a result of the expiration of the duration or a failure. In some embodiments, the fault injection system may inject multiple faults so that they are executed simultaneously. For example, the fault injection system may inject a CPU usage fault and a memory usage fault to assess a combination of excessive CPU usage and memory usage. The collection of fault profiles along with an indication of which fault profiles resulted in a failure can be used to identify problems that may occur in the distributed system and configuration changes that may reduce the chances of those problems occurring.

In some embodiments, a resiliency assessment plan may specify a technique to be used in generating the fault profiles given the possible values for the dimensions. The fault profile generation techniques may include a random technique, a linearly increasing technique, a quadratic increasing technique, an exponentially increasing technique, a constant technique, and so on. If the number of dimensions is large and/or the number of possible values is large, the fault injection system may use various generation techniques that are intended to generate an overall sampling of the space of possible fault profiles such as a design-of-experiments technique. Some techniques may be applied to each dimension separately. For example, given the possible values of a resiliency assessment plan of (CPU, 50-80%, 2-5 minutes, 50-100%), the resiliency assessment plan may specify that the number of virtual machines is to increase linearly by 5%, the number of minutes is to be randomly selected, and the intensity is to increase exponentially. The fault injection system may generate the following fault profiles from this resiliency assessment plan:

(CPU, 50%, 3 minutes, 50%)
(CPU, 50%, 2 minutes, 51%)
(CPU, 50%, 2 minutes, 53%)
(CPU, 50%, 5 minutes, 57%)
(CPU, 50%, 3 minutes, 65%)
(CPU, 50%, 2 minutes, 81%)
(CPU, 50%, 3 minutes, 99%)
(CPU, 55%, 2 minutes, 50%)
(CPU, 55%, 2 minutes, 51%)
(CPU, 55%, 5 minutes, 53%)
(CPU, 55%, 5 minutes, 57%)
(CPU, 55%, 6 minutes, 65%)
(CPU, 55%, 3 minutes, 81%)
(CPU, 55%, 2 minutes, 99%) . . . .

The fault injection system may inject these faults in sequence. If a failure is detected, the fault injection system may skip subsequent fault profiles whose fault strength is higher in the sense that those fault profiles are even more likely to generate a failure. For example, if a failure is detected for a first fault profile of (CPU, 50%, 2 minutes, 81%), then it is likely that a second fault profile of (CPU, 50%, 3 minutes, 99%)

would also generate a failure. The second fault profile has a higher fault strength in the sense that the CPU usage of 99% for 3 minutes on the same number of virtual machines is more likely to cause a failure than a CPU usage of 81% for 2 minutes. If the CPU usage of the first fault profile was 81% for 5 minutes, rather than for 2 minutes, then the first fault profile would have a higher strength than the second fault profile as to duration, but the second fault profile would have a higher strength than the first fault profile as to intensity.

In some embodiments, the fault injection system may rely on an existing health monitor of a distributed system to determine whether an injected fault results in a failure. A health monitor of a distributed system may collect information from the computers, storage devices, network devices, operating systems, front-end systems, file systems, load-balancing systems, database systems, security systems, applications, and so on. The health monitor analyzes the collected information and determines whether the distributed system is healthy—that is, operating at an acceptable level. For example, the front-end systems may periodically report various response time statistics such as average response time, median response time, largest response time, and so on. The health monitor determines whether the response time is at an acceptable level. If not, the health monitor may generate an "unhealthy" event, which may cause, for example, a technician to be notified or additional resources (e.g., database servers) to be allocated to the distributed system. If the health monitor generates an unhealthy event during the execution of an injected fault, then the fault injection system may assume that the unhealthy event was generated as a result of the injected fault and consider the injected fault to have caused a failure. The fault injection system, however, may consider some unhealthy events to not be generated as a result of an injected fault. For example, an unhealthy event indicating the loss of power to a computer is unlikely to be generated as a result of an injected fault that increases CPU usage. When the fault injection system determines that an unhealthy event is generated as a result of an injected fault, it may terminate the execution of the fault and suppress any notifications or other responsive actions as the termination of the execution is likely to correct the failure.

In some embodiments, the fault injection system may generate a graphic based on the faults that resulted in a failure to help a user visualize the conditions that caused the failure. For example, for a fault type of CPU usage, the fault injection system may generate a 3D graph with the axes corresponding to dimensions such as number of virtual machines, duration, and intensity. The graph may have a point for each fault that resulted in a failure. The fault injection system may also highlight the volume enclosed by the points and allow a user to rotate the volume to help in the analysis of the failures. When a user selects a point of the graph, the fault injection system may display information about the fault such as the type of unhealthy event, execution time of the failure, and so on. The fault injection system may also allow a user to select a value for one of the three dimensions and the fault injection system may then generate a 2D graph based on the other two dimensions.

FIG. 1 is a flow diagram that illustrates the overall processing to assess the resiliency of a system in some embodiments. An assess resiliency component 100 generates fault profiles, injects faults based on the profiles, and determines whether the defaults caused a failure. In block 101, the component generates fault profiles based on a resiliency assessment plan specified by a user. In block 102, the component selects the next fault profile starting with the first. In decision block 103, if all the fault profiles have already been selected, then the component completes, else the component continues at block 104. In block 104, the component injects a fault into the system based on the selected fault profile. In block 105, the component waits for the duration of the injected fault or an unhealthy event from a health monitor. In decision block 106, if an unhealthy event is received, then the component continues at block 107, else the component loops to block 102 to select the next fault profile. In block 107, the component terminates execution of the fault. In block 108, the component marks the fault as having caused the failure. In block 109, if the component is to continue assessing resiliency of the distributed system (e.g., based on user input), then the component loops to block 102 to select the next fault profile, else the component completes.

Figure 2:
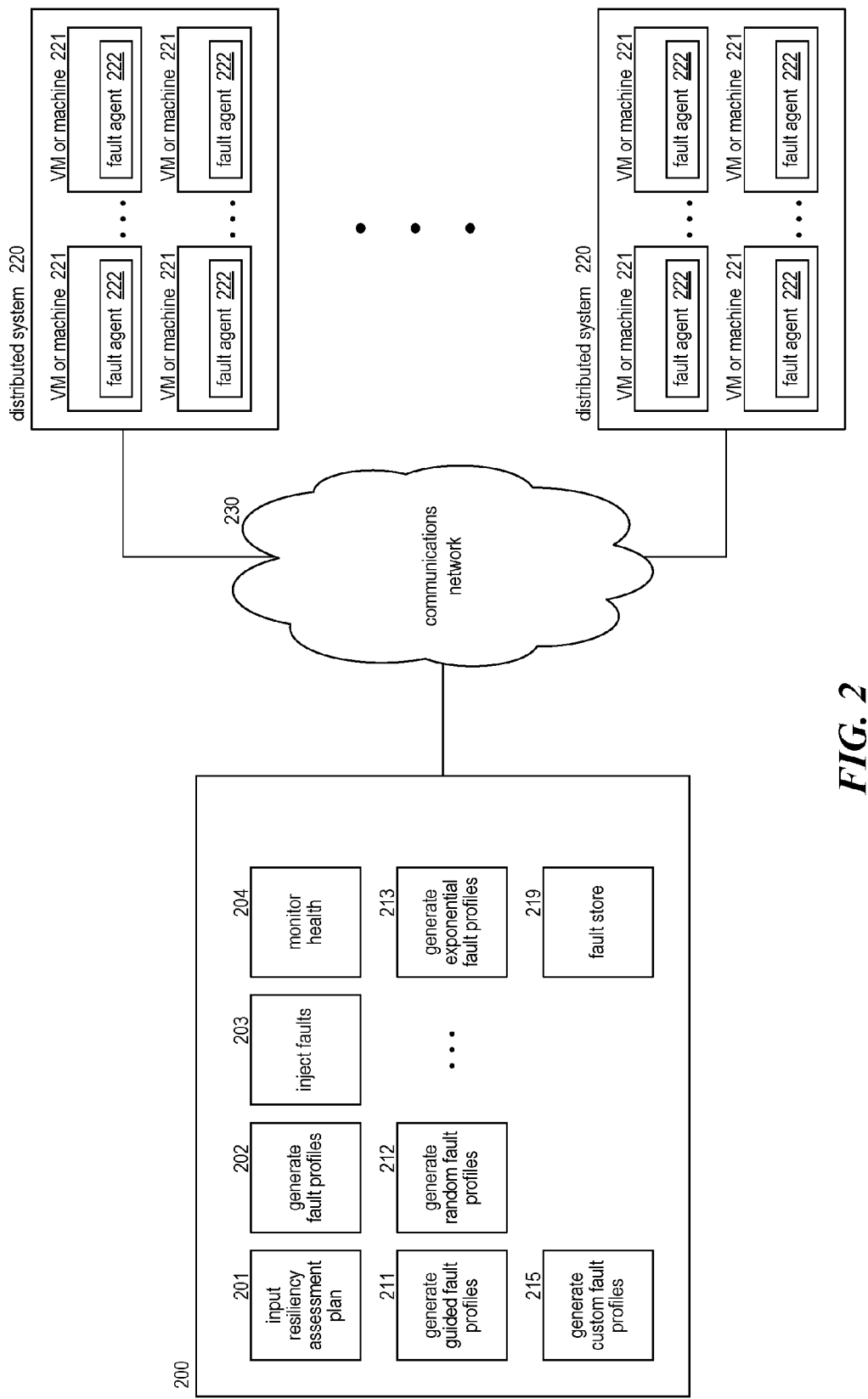
FIG. 2 is a block diagram that illustrates components of a fault injection system and a distributed system in some embodiments.

FIG. 2 is a block diagram that illustrates components of a fault injection system and a distributed system in some embodiments. A fault injection system 200 is connected to distributed system 220 via a communications network 230. The fault injection system includes an input resiliency assessment plan component 201, a generate fault profiles component 202, an inject faults component 203, and a monitor health component 204. The input resiliency assessment plan component receives a resiliency assessment plan from a user and stores it in a fault store 219, which is a repository of fault-related information. The generate fault profiles component generates fault profiles based on the resiliency assessment plan. The generation of the fault profiles may be done in batch mode prior to injecting any faults or the next fault profile may be generated immediately after the execution of a prior fault profile. The inject faults component distributes the faults to fault agents 222 of the machines 221 (virtual or physical) that are to execute the faults. The monitor health component may monitor the health of the distributed system or may interface with an existing monitor health system of the distributed system. The generate fault profiles component may invoke various types of fault generation techniques such as that of a generate guided faults profiles component 211, a generate random fault profiles component 212, and a generate exponential fault profiles component 213. The generate guided fault profiles component generates fault profiles using a random selection of possible values for an ordering of dimensions specified by the resiliency assessment plan. The generate random fault profiles component generates random values for each dimension. The generate exponential fault profiles component generates values that increase exponentially. The fault injection system may also include a generate custom fault profiles component that is provided by an administrator of the distributed system to generate custom fault profiles. For example, an administrator may want to test the resiliency to excessive CPU usage by exponentially increasing CPU usage until a failure is detected and then linearly increasing the CPU utilization from the last CPU usage for which a failure was not detected.

The computing systems on which the fault injection system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD), and other storage. The computer-readable storage media may have data recorded on them or may be encoded with computer-executable instructions or logic that implements the fault injection system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys, and for encrypting and decrypting deployment data using the keys.

The fault injection system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the fault injection system may be implemented in hardware using, for example, an application-specific integrated circuit (ASIC).

Figure 3:
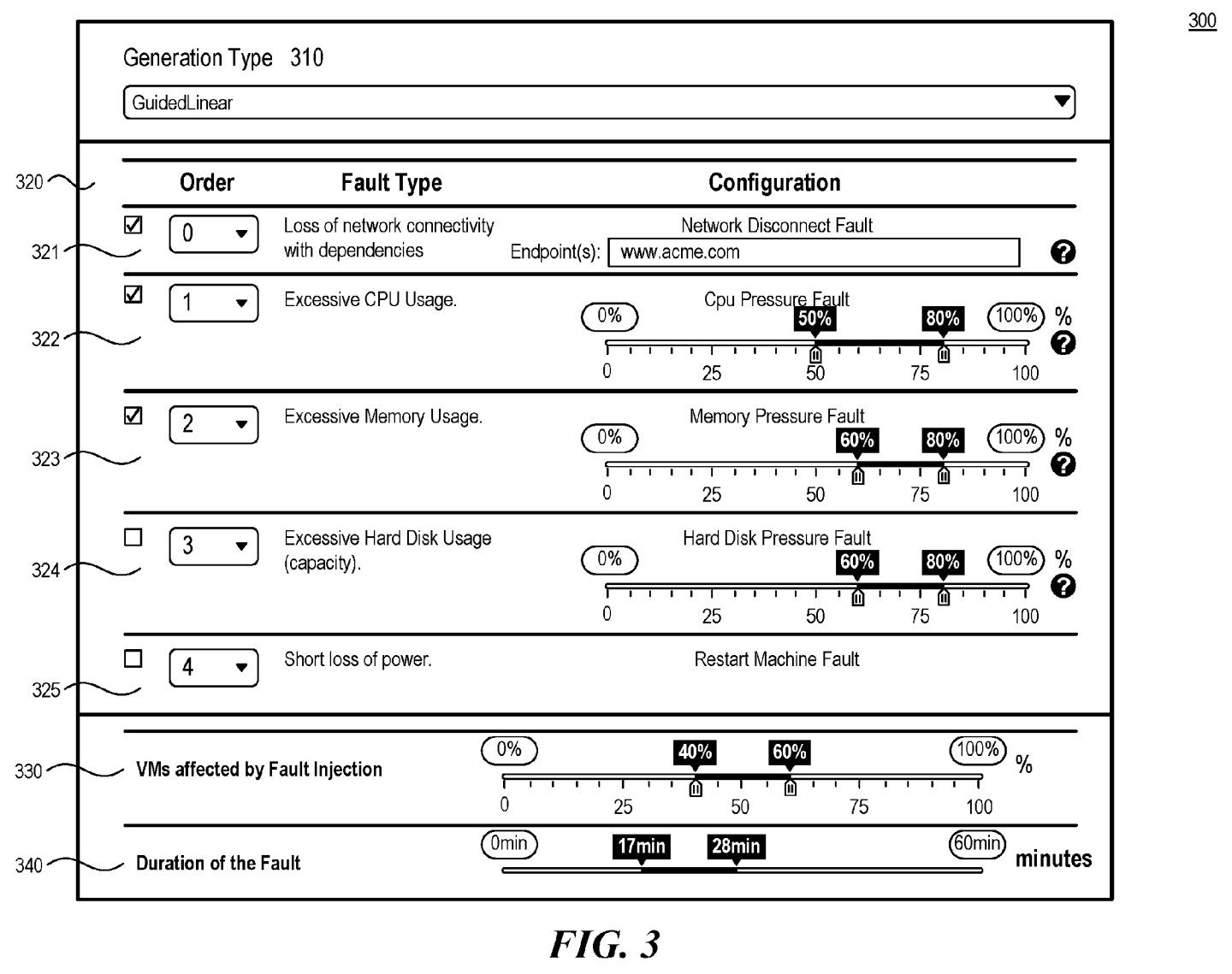

FIG. 3 is a diagram that illustrates a user interface for generating a resiliency assessment plan in some embodiments. A display page 300 includes a generation type area 310, a fault type area 320, a machines area 330, and a duration area 340. The generation type area 310 includes a drop-down list for selecting the generation technique for the resiliency assessment plan. The fault type area 320 includes sub-areas 321-325 for specifying the fault types for the fault profiles. Each sub-area includes a checkbox to indicate whether the fault type is to be included in the resiliency assessment plan. In this example, the checkboxes are selected for loss of network connectivity, excessive CPU usage, and excessive memory usage. The order field is a drop-down list to specify the order in which the fault profiles for the fault types are to be generated. In this example, all the fault profiles for loss of network connectivity would be generated first, followed by the fault profiles for excessive CPU usage, followed by the fault profiles for excessive memory usage. The fault injection system may inject faults in the order in which the fault profiles are generated. Each sub-area may also include fields for entering configuration information. For example, sub-area 321 includes a field for entering the endpoint that is to be the target of the loss of network connectivity, and sub-area 322 includes a slider for specifying the range of possible values for the percentage of CPU usage. The machines sub-area 330 includes a slider for specifying the range of possible values for the percentage of machines to be affected by the resiliency assessment plan. The duration sub-area 340 includes a slider for specifying the range of possible values for the duration of the execution of each fault. In some embodiments, each area and sub-area may have a generation drop-down list to specify the generation technique. For example, a user may specify that the number of virtual machines is to increase linearly, the percentage of CPU usage is to be selected randomly, and the percentage of memory usage and the duration is to increase exponentially.

Figure 4:
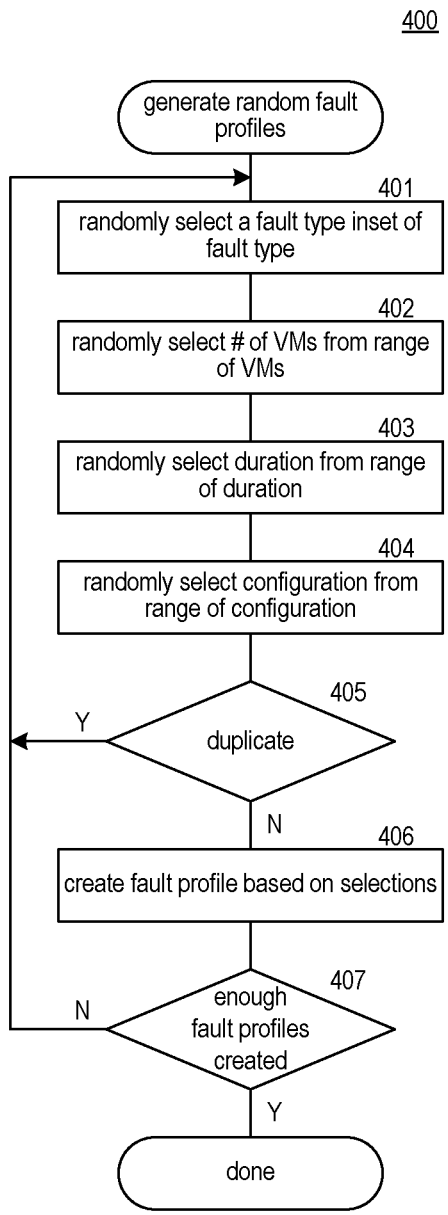
FIG. 4 is a flow diagram that illustrates the processing of a generate random fault profiles component of the fault injection system in some embodiments.

FIG. 4 is a flow diagram that illustrates the processing of a generate random fault profiles component of the fault injection system in some embodiments. A generate random fault profiles component 400 generates fault profiles by randomly selecting a value for each dimension from the possible values for that dimension specified by the resiliency assessment plan. In block 401, the component randomly selects a fault type from the set of fault types specified by the resiliency assessment plan. In block 402, the component randomly selects a number of virtual machines from the range of virtual machines specified by the resiliency assessment plan. In block 403, the component randomly selects a duration from the range of durations specified by the resiliency assessment plan. In block 404, the component randomly selects a configuration from the range of configurations specified by the resiliency assessment plan. In decision block 405, if the randomly selected values are duplicates of previously selected values, the component loops to block 401 to repeat the process, else the component continues at block 406. In block 406, the component creates a fault profile based on the selections. In decision block 407, if enough fault profiles have been created based on the resiliency assessment plan, then the component completes, else the component loops to block 401 to create another fault profile.

Figure 5:
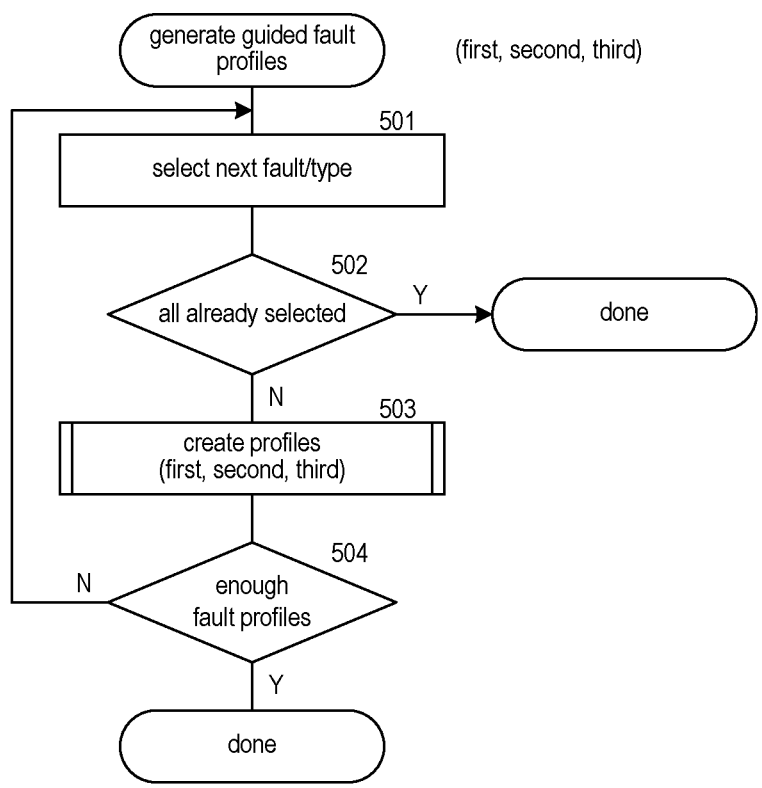
FIG. 5 is a flow diagram that illustrates the processing of a generate guided fault profiles component of the fault injection system in some embodiments.

FIG. 5 is a flow diagram that illustrates the processing of a generate guided fault profiles component of the fault injection system in some embodiments. A generate guided fault profiles component 500 generates fault profiles by randomly selecting values for dimensions with the ordering of the dimensions specified by the resiliency assessment plan. The component may assume that the fault type is the first ordered dimension and receive an input of the ordering of the other dimensions as first, second, and third as indicated by the resiliency assessment plan. For example, an ordering of the other dimensions may be percentage of virtual machine, configuration, and then duration. In such a case, the component selects a fault type, percentage of virtual machines, a configuration value, and then varies the duration values followed by selecting a new configuration value and then varying the duration values, and so forth. In block 501, the component selects the next fault type specified by the resiliency assessment plan. In decision block 502, if all the fault types have already been selected, then the component completes, else the component continues at block 503. In block 503, the component invokes a create profile component passing an indication of the ordering of the other dimensions. In block 504, if enough fault profiles have been created based on the resiliency assessment plan, then the component completes, else the component loops to block 501 to select the next fault type.

Figure 6:
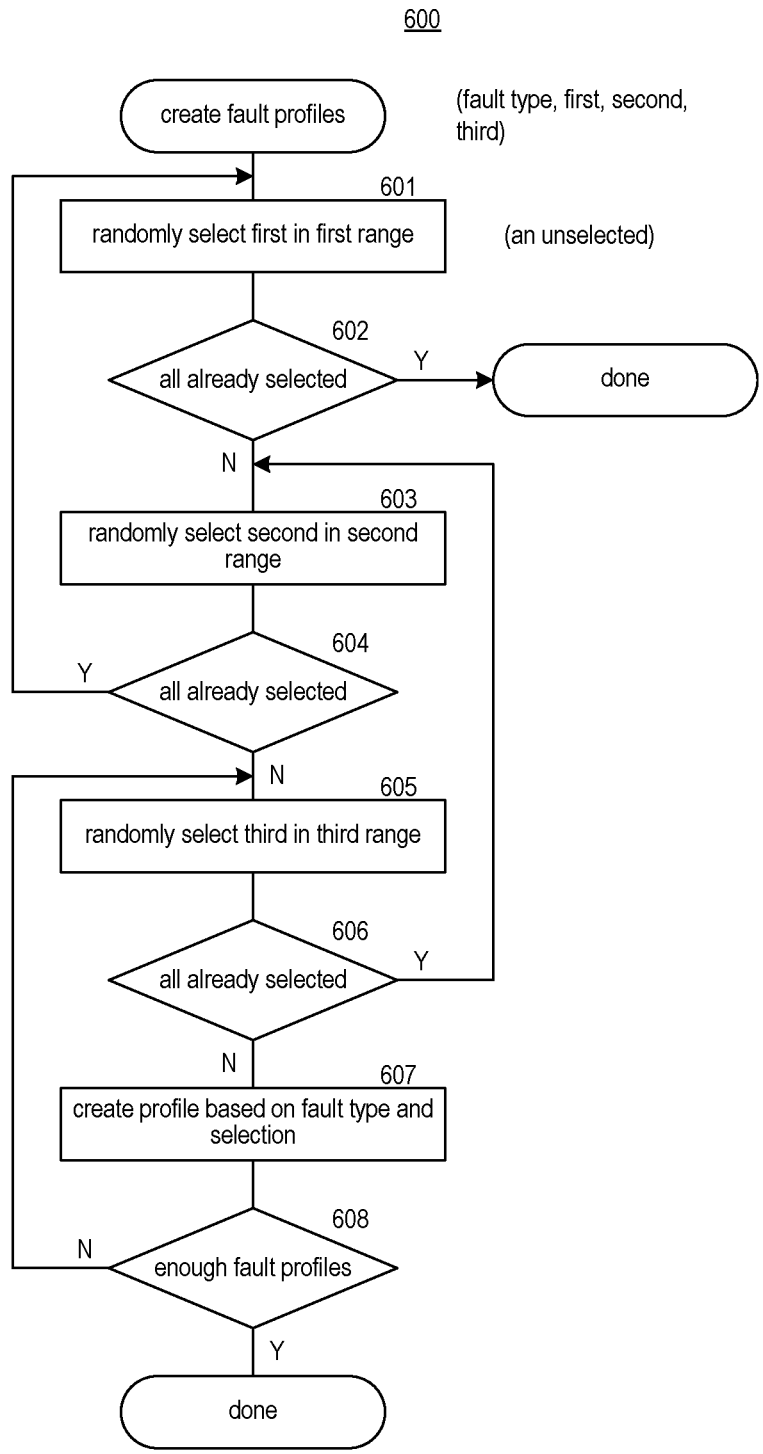
FIG. 6 is a flow diagram that illustrates the processing of a create fault profiles component of the fault injection system in some embodiments.

FIG. 6 is a flow diagram that illustrates the processing of a create fault profiles component of the fault injection system in some embodiments. A create fault profiles component 600 is passed an indication of fault type and an ordering of the other dimensions, and generates fault profiles based on the ordering. In block 601, the component randomly selects a possible value for the first dimension that has not yet been selected. In decision block 602, if all the possible values have already been selected, then the component completes, else the component continues at block 603. In block 603, the component randomly selects a possible value for the second dimension that has not yet been selected for the currently selected value of the first dimension. In decision block 604, if all the possible values have already been selected, then the component loops to block 601 to select a different possible value for the first dimension, else the component continues at block 605. In block 605, the component randomly selects a possible value for the third dimension that has not yet been selected for the currently selected values of the first and second dimensions. In decision block 606, if all the possible values have already been selected, then the component loops to block 603 to select a different possible value for the second dimension, else the component continues at block 607. In block 607, the component creates a fault profile based on the fault type and the selections of values. In decision block 608, if enough fault profiles have already been created as indicated by the resiliency assessment plan, then the component completes, else the component loops to block 605 to selects another value for the third dimension.

Figure 7:
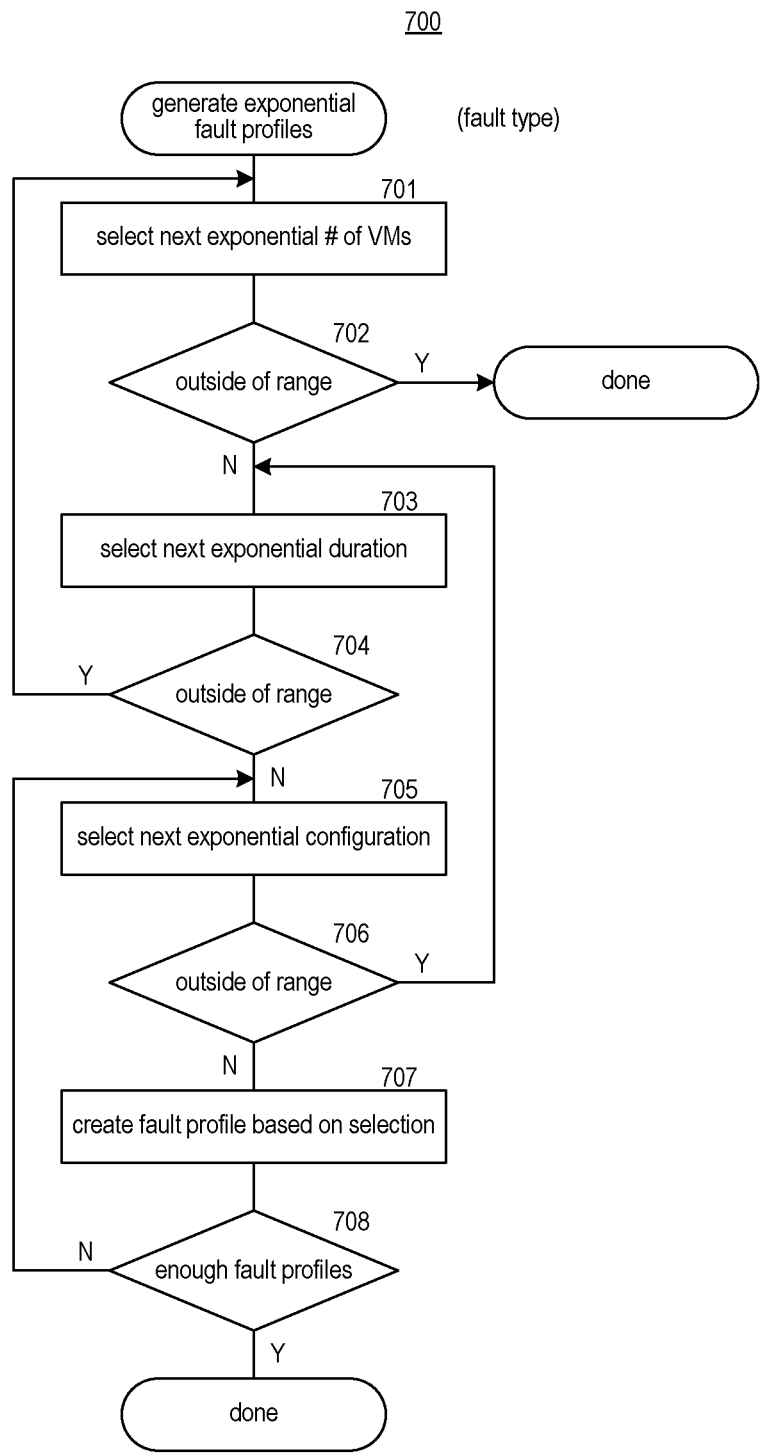
FIG. 7 is a flow diagram that illustrates the processing of a generate exponential fault profiles component of the fault injection system in some embodiments.

FIG. 7 is a flow diagram that illustrates the processing of a generate exponential fault profiles component of the fault injection system in some embodiments. A generate exponential fault profiles component 700 is invoked to generate fault profiles for a specific fault type. In block 701, the component selects the next exponential number of virtual machines in the range as indicated by the resiliency assessment plan. In decision block 702, if the number would be outside the range, then the component completes, else the component continues at block 703. In block 703, the component selects the next exponential value for duration in the range. In decision block 704, if duration would be outside the range, then the component loops to block 701 to select the next exponential number of virtual machines, else the component continues at block 705. In block 705, the component selects the next exponential value for the configuration in the range. In decision block 706, if the exponential value would be outside the range, then the component loops to block 703 to select the next exponential value for duration, else the component continues at block 707. In block 707, the component creates a fault profile based on the selections. In decision block 708, if enough fault profiles have been created as specified by the resiliency assessment plan, then the component completes, else the component loops to block 705 to select the next exponential value for the configuration.

Figure 8:
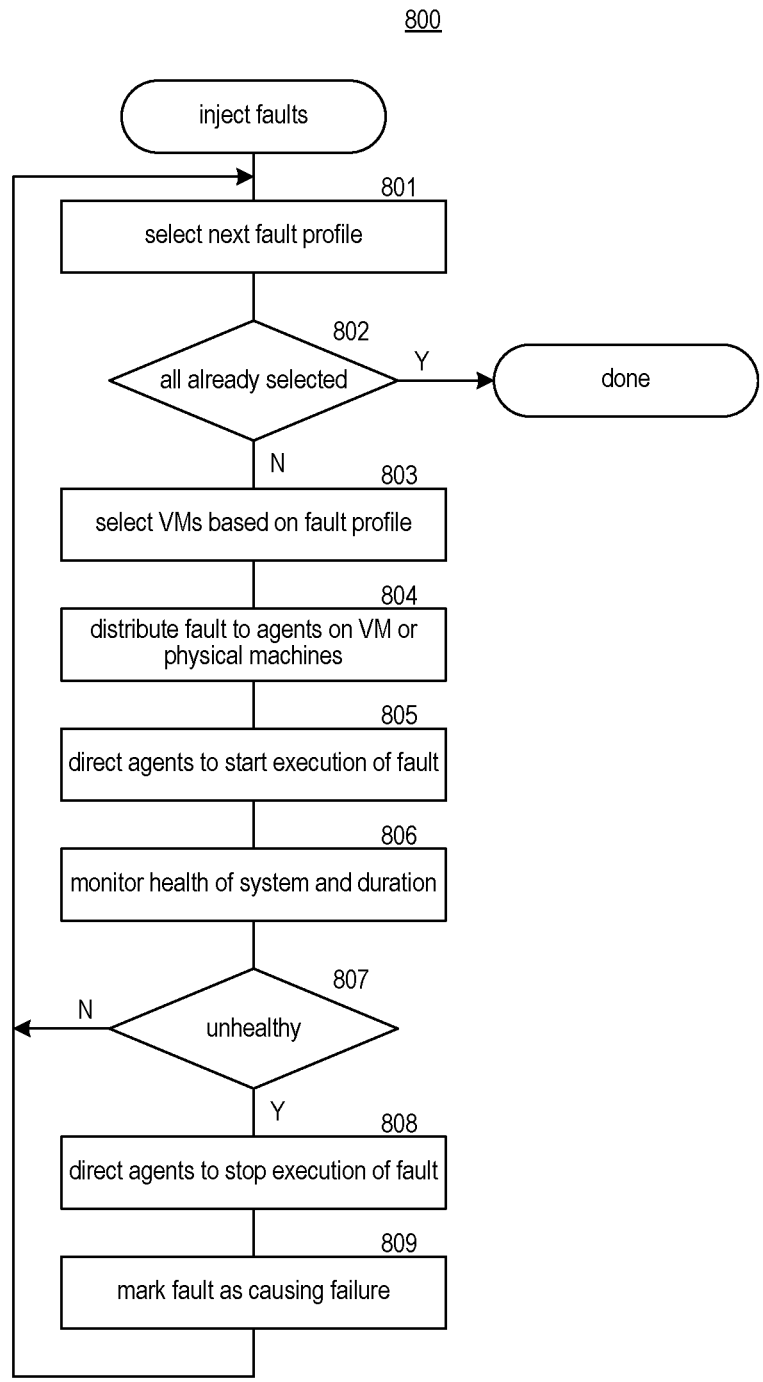
FIG. 8 is a flow diagram that illustrates the processing of an inject faults component of the fault injection system in some embodiments.

FIG. 8 is a flow diagram that illustrates the processing of an inject faults component of the fault injection system in some embodiments. An inject faults component 800 is invoked to inject faults based on fault profiles and to identify whether each fault results in a failure. In block 801, the component selects the next fault profile. In decision block 802, if all the fault profiles have already been selected, then the component completes, else the component continues at block 803. In block 803, the component selects virtual machines based on the fault profile. In block 804, the component distributes the fault to the agents on the physical machines or virtual machines that host the distributed system. In block 805, the component directs the agents to start execution of the fault. In block 806, the component monitors the health of the system and the duration. In decision block 807, if the monitoring indicates that the system is unhealthy, then the component continues at block 808, else the component loops to block 801 to select the next fault profile. In block 808, the component directs the agents to stop execution of the fault. The component may also direct the health monitor system to suppress any unhealthy event notifications. In block 809, the component marks the fault as having caused the failure and then loops to block 801 to select the next fault profile. In addition to marking the fault as having caused the failure, the component may collect information about the failure such as machines affected by the failure, components of the system affected by the failure, execution time when the failure was detected, and so on.

Figure 9:
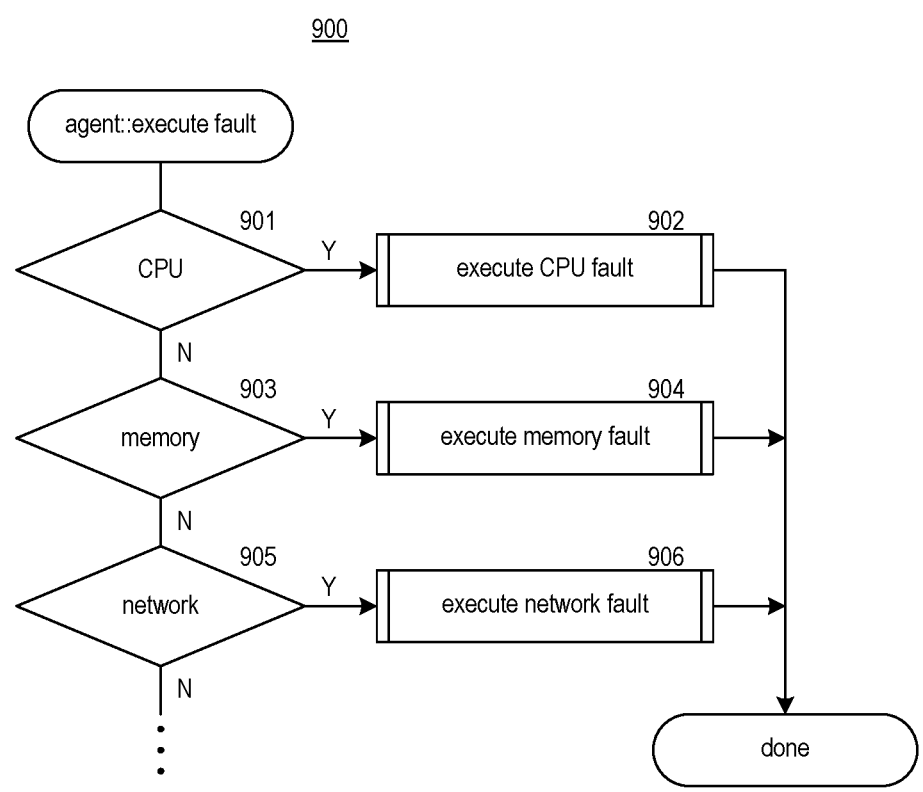
FIG. 9 is a flow diagram that illustrates the processing of an execute fault component of an agent of the fault injection system in some embodiments.

FIG. 9 is a flow diagram that illustrates the processing of an execute fault component of an agent of the fault injection system in some embodiments. An execute fault component 900 is invoked when the fault injection system directs the agent to start executing a fault. In decision block 901, if the fault type of the fault is CPU usage, then the component continues at block 902, else the component continues at block 903. In block 902, the component invokes an execute CPU fault component and then completes. In decision block 903, if the fault type of the fault is memory usage, then the component continues at block 904, else the component continues at block 905. In block 904, the component invokes an execute memory fault component and then completes. In decision block 905, if the fault type of the fault is a network fault, then the component continues at block 906, else the component continues processing any other possible fault types. In block 906, the component invokes an execute network fault component and then completes.

Figure 10:
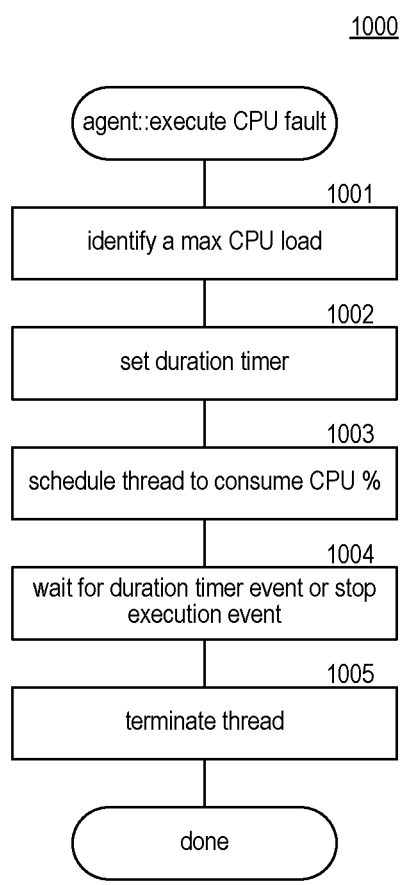
FIG. 10 is a flow diagram that illustrates the processing of an execute CPU fault component of an agent of the fault injection system in some embodiments.

FIG. 10 is a flow diagram that illustrates the processing of an execute CPU fault component of an agent of the fault injection system in some embodiments. An execute CPU fault component 1000 is invoked to execute CPU fault. In block 1001, the component identifies the maximum CPU load that is allocated to a virtual machine, for example, in cycles per second. In block 1002, the component sets a duration timer based on the duration of the fault. In block 1003, the component schedules a thread to consume the percentage of CPU usage as specified by the fault. In block 1004, the component waits for the duration timer or a stop execution event to be received from the fault injection system. In block 1005, the component terminates the thread and then completes.

The following paragraphs describe various embodiments of aspects of the fault injection system. An implementation of the fault injection system may employ any combination of the embodiments. The processing described below may be performed by a computing device with a processor that executes computer-executable instructions stored on a computer-readable storage medium that implements the fault injection system.

A method performed by a computing system for assessing resiliency of a distributed system is provided. For each of a plurality of dimensions, the method accesses by the computing system an indication of possible values for the dimension. For each of a plurality of fault profiles, the method creates by the computing system the fault profile by, for each of the plurality of dimensions, selecting by the computing system a possible value for that dimension. For at least some of the fault profiles, the method injects a fault based on the fault profile into the distributed system for execution and determines whether a failure was detected during execution of the fault. In some embodiments, the dimensions are selected from a group comprising fault type, duration, number of machines, and configuration. In some embodiments, the fault types are selected from a group consisting of CPU usage, memory usage, non-memory storage usage, network access, security, and loss of power, a process kill, restart, or crash, a corrupt file system, and change in system date. In some embodiments, the injecting of the faults injects faults of increasing fault strength. In some embodiments, when a failure is first detected, the method terminates injecting of the faults. In some embodiments, the selecting of a possible value for at least one dimension selects a possible value randomly. In some embodiments, the selecting of a possible value for at least one dimension selects a linearly increasing possible value. In some embodiments, the selecting of a possible value for at least one dimension selects an exponentially increasing possible value. In some embodiments, the determining of whether a failure was detected is based on output of a health monitor of the distributed system. In some embodiments, the method further displays a graphic illustrating the fault profiles for which a failure was detected. In some embodiments, the method receives from a user a specification of the possible values for at least some of the dimensions. In some embodiments, the method receives a specification of a function for generating possible values for at least some of the dimensions.

A computing system for assessing resiliency of a distributed system is provided. The computing system comprising computer-readable storage media storing computer-executable instructions and a processor for executing the computer-executable instructions stored in the computer-readable storage media. The computer executable instructions include instructions that create a plurality of fault profiles, each fault profile specifying at least one possible value for each of a plurality of dimensions of the fault profile. The instructions also determine whether a fault that is based on a fault profile results in a failure by injecting the fault into the distributed system for execution and monitoring health of the distributed system wherein when the monitoring indicates that the distributed system is not healthy, the fault is determined to have generated failure. In some embodiments, the instructions determine that an injected fault generates a failure, terminate execution of the fault and suppress responsive actions to the failure. In some embodiments, the dimensions of the fault profile include a fault type, number of machines, duration, and configuration. In some embodiments, the configuration is an intensity of the fault type. In some embodiments, the assessing the resiliency of the distributed system is performed in response to a change in deployment of the distributed system. In some embodiments, the instructions to repeatedly determine whether different faults generate a failure until a fault is determined to generate a failure. In some embodiments, faults of increasing fault strength are injected.

A method performed by a computing system for assessing resiliency of a system is provided. The method automatically creates, by the computing system, a plurality of fault profiles. Each fault profile has dimensions and specifies a possible value for each dimension. The method injects faults based on the fault profiles into the system for execution. The method monitors health of the system while a fault is executing. When the monitoring indicates that the system is not healthy, the method indicates that the injected fault results in a failure. In some embodiments, different faults are injected for execution at the same time.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the fault injection system may be used to test the resiliency of a system that might not be considered a distributed system. One such system may be a parallel system implemented on nodes of a massively parallel computer system (e.g., a high-performance computing system). Accordingly, the invention is not limited except as by the appended claims.

The invention claimed is:

1. A method performed by a computing system for assessing resiliency of a distributed system of components, the method comprising:
   for each dimension of a plurality of dimensions, accessing by the computing system, an indication of possible values for the dimension;
   for each of a plurality of fault profiles, creating by the computing system the fault profile by, for each dimension of the plurality of dimensions, selecting by the computing system an exponentially increasing possible value for that dimension; and
   for more than one of the fault profiles,
      injecting a fault based on the fault profile into the distributed system for execution;
      determining whether a failure was detected during execution of the fault in the distributed system; or whether the components of the distributed system counteracted the injected fault; and
      assessing resiliency of the distributed system based on a determination as to whether a failure was detected or the components counteracted the injected fault during execution of the fault.

2. The method of claim 1, further comprising selecting the dimensions from a group comprising fault type, duration, number of machines, and configuration.

3. The method of claim 1, wherein injecting the fault further comprises injecting faults of increasing fault strength.

4. The method of claim 3, further comprising:
   based on a determination that the components did not counteract the detected failure, terminating the injecting of the faults.

5. The method of claim 1, wherein determining whether a failure was detected comprises basing the determination of whether the failure was detected on an output of a health monitor of the distributed system.

6. The method of claim 1, further comprising displaying a graphic illustrating the fault profiles for which a failure was detected.

7. The method of claim 1, further comprising receiving from a user a specification of the possible values for more than one of the dimensions.

8. The method of claim 1, further comprising receiving a specification of a function for generating possible values for more than one of the dimensions.

9. A computing system for assessing resiliency of a distributed system of components, the computing system comprising:
   computer-readable storage media storing computer-executable instructions for controlling the computing system to:
      create a plurality of fault profiles, each fault profile specifying at least one exponentially increasing possible value for each of a plurality of dimensions of the fault profile;
      inject a fault based on a fault profile of the fault profiles into the distributed system for execution;
      monitor a health of the distributed system during execution of the fault;
      determine whether execution of the fault resulted a failure in a component of the distributed system or wherein components of the system counteracted the fault based on the monitored health;
      and
      assess resiliency of the distributed system based on a determination as to whether execution of the fault resulted in a failure or the components counteracted the fault during execution of the fault; and
   a processor for executing the computer-executable instructions stored in the computer-readable storage media.

10. The computing system of claim 9, wherein the computer-executable instructions further comprise instructions to control the computing system to, upon determining that an injected fault generates a failure, terminate execution of the fault and suppress responsive actions to the failure.

11. The computing system of claim 9, wherein the dimensions of the fault profile include a fault type, number of virtual machines, duration, and configuration.

12. The computing system of claim 11, wherein the configuration is an intensity of the fault type.

13. The computing system of claim 9, wherein the assessing the resiliency of the distributed system is performed in response to a change in deployment of the distributed system.

14. The computing system of claim 9, wherein the computer-executable instructions include instructions for controlling the computing system to repeatedly determine whether different faults generate a failure until a fault is determined to generate a failure.

15. The computing system of claim 14, wherein the computer-executable instructions for controlling the computing system are further to cause the computing system to inject faults of increasing fault strength into the distributed system.

16. A method performed by a computing system for assessing resiliency of a system of components, the method comprising:

automatically creating, by the computing system, a plurality of fault profiles, each fault profile having dimensions, and each fault profile specifying an exponentially increasing possible value for each dimension;

injecting faults based on the fault profiles into the system for execution;

monitoring health of the system while the components of the system are executing the injected faults; and based on the monitoring indicating that the system is not healthy, determining whether the injected faults generated a failure in a component of the system or whether the components of the system counteracted the injected faults;

assessing resiliency of the system based on a determination as to whether a failure was detected or the components counteracted the injected faults during execution of the faults; and indicating the assessed resiliency of the system based on the determination as to whether the components counteracted the generated failure.

17. The method of claim 16, further comprising injecting different faults for execution at the same time.

* * * * *